R. HURD.
WAGON-BRAKE.
No. 187,863.  Patented Feb. 27, 1877.
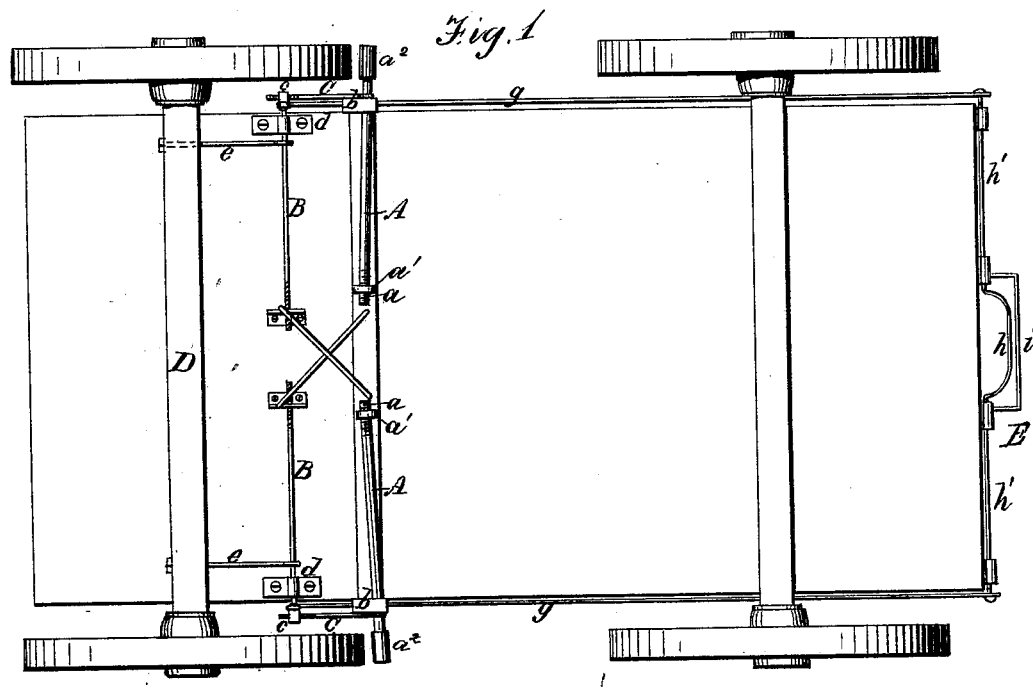
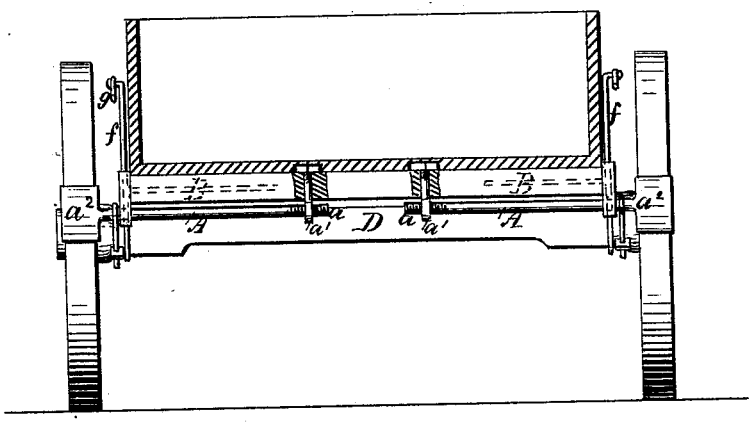

UNITED STATES PATENT OFFICE.

REUBEN HURD, OF WESTFORD, MASSACHUSETTS.

IMPROVEMENT IN WAGON-BRAKES.

Specification forming part of Letters Patent No. 187,863, dated February 27, 1877; application filed July 6, 1876.

*To all whom it may concern:*

Be it known that I, REUBEN HURD, of Westford, in the county of Middlesex and State of Massachusetts, have invented certain new and useful Improvements in Brakes; and I do hereby declare that the following is a full, clear, and exact description thereof, which will enable others skilled in the art to which it appertains to make and use the same, reference being had to the accompanying drawing, and to letters of reference marked thereon, which form a part of this specification, and in which—

Figure 1 is an inverted plan view of my improved brake applied to a wagon; and Fig. 2 is an end view thereof, and the wagon or vehicle partly in section.

Corresponding parts in the two figures are designated by like letters.

This invention relates to a certain improvement in brakes; and it consists of adjustable rods or bars having their inner ends connected to the wagon by pivots or eyebolts, and their outer ends, which are provided with shoes, adjustably connected to adjustable crank-shafts connected to the axle, which shafts are provided with arms, to which the braking-lever is attached, substantially as hereinafter more fully set forth.

In the annexed drawing, A A are the shoe-bars, having their inner ends threaded, as at $a\ a$, and entering eyebolts $a^1\ a^1$, pivoted in a cross-piece of the wagon-body. Threading the bars or rods A A permits of their endwise adjustment, to adapt them to vehicles of varying widths. Pivoting the eyebolts $a^1\ a^1$ allows the bars or rods A A to be moved laterally, so as to cause their shoes $a^2\ a^2$ to engage with and brake the wheels of the vehicle. The bars or rods A A are supported at their outer ends in stirrups $b\ b$, fastened to and depending from the wagon or vehicle body, to permit of their lateral movement. The said bars are adjustably connected to the crank-shafts B B by threaded rods C C, their threaded portions entering eyes in the said shafts, as at $c\ c$, Fig. 1. By this adjustability of connection the pressure of the shoes upon the wheels may be regulated. The crank-shafts B B are also threaded at their inner ends, and enter eyes in plates or bolts depending from the wagon-body, to admit of their endwise adjustment to conform to the adjustment of the shoe bars or rods A A, in adapting the brake to different-sized vehicles. The said shafts are suitably hung in bearings $d\ d$, fastened to the wagon-body, and connected to the rear axle D of the vehicle by short rods or bars $e\ e$, through which they pass. This combination and arrangement of parts brings the whole strain or resistance upon the axle. Extending upwardly from the crank-shafts B B are arms $f\ f$, to which are connected, by rods $g\ g$, the braking-lever E, suitably fulcrumed to the front of the vehicle. The lever E consists of a bow, $h$, extending from the sides of which are arms or shafts $h'\ h'$, connected to the rods $g\ g$. The bow $h$ of the lever E extends up through a stirrup, $i$, fastened to the front of the vehicle, which limits the movement of the lever as pressure is applied thereto.

Having thus described my invention, what I claim, and desire to secure by Letters Patent, is—

1. The brake-levers E $h\ h'$ and rods $g\ g$, in combination with the independently-movable shoe-bars A A and intermediate mechanism, substantially as and for the purpose set forth.

2. The pivoted and laterally-adjustable shoe-bars A A, stirrups $b\ b$, rods C C, adjustable crank-shafts B B, connected to axle D by rods $e\ e$, substantially as and for the purpose set forth.

In testimony that I claim the foregoing as my own I hereunto affix my signature in presence of two witnesses.

REUBEN HURD.

Witnesses:
  A. T. SANGSTON,
  CHAS. J. HEDRICK.